United States Patent [19]

Jokinen

[11] Patent Number: 4,865,358
[45] Date of Patent: Sep. 12, 1989

[54] SLIDE RAIL HOSE ASSEMBLY

[75] Inventor: Donald R. Jokinen, Florence, Wis.

[73] Assignee: Champion International Corporation, Stamford, Conn.

[21] Appl. No.: 257,819

[22] Filed: Oct. 14, 1988

[51] Int. Cl.⁴ .................................................. F16L 3/00
[52] U.S. Cl. ........................................ 285/64; 285/61; 285/191
[58] Field of Search ............... 285/61, 64, 190, 191, 285/272, 279, 281; 191/12 R; 104/94; 205/155

[56] References Cited

U.S. PATENT DOCUMENTS

| | | | |
|---|---|---|---|
| 543,709 | 7/1895 | Simpson | 285/64 |
| 566,853 | 9/1896 | Foreman | 285/64 |
| 570,890 | 11/1896 | Baird | 285/64 |
| 579,777 | 3/1897 | Sergent | 285/61 |
| 589,345 | 8/1897 | Emery | 285/64 |
| 604,898 | 5/1898 | Green et al. | 285/64 |
| 1,046,909 | 12/1912 | Wagner | 285/64 |
| 2,034,558 | 3/1936 | Bronson | 285/61 |
| 2,170,557 | 8/1939 | Guarnaschelli | 285/61 |
| 2,752,198 | 6/1956 | Crow | 285/272 |
| 2,798,506 | 7/1957 | Baker | 285/190 |
| 2,831,709 | 4/1958 | Shaw et al. | 285/272 |
| 2,858,381 | 10/1958 | Goldberg et al. | 191/12 R |
| 3,155,051 | 11/1964 | Sherburne | 105/155 |
| 3,310,003 | 3/1967 | Bryan | 104/94 |
| 3,507,521 | 4/1970 | Bridgland, Jr. | 285/281 |
| 3,577,930 | 5/1971 | Rooklyn | 248/62 |
| 4,437,690 | 3/1984 | Drath | 285/272 |

*Primary Examiner*—Randolph A. Reese
*Assistant Examiner*—Anthony Knight
*Attorney, Agent, or Firm*—Evelyn M. Sommer

[57] ABSTRACT

A slide rail hose assembly is provided with a plurality of swivel joint assemblies each of which are suspendable from carriages which are movable along a rail. Each swivel joint comprises a pair of fittings which are pivotably mounted to a centrally disposed suspendable seal plate. The seal plate is removably suspended from the carriages. Sections of hose are releasably connectable to the fittings of each swivel joint, with hose sections extending between and connecting adjacent swivel joints. The slide rail hose assembly can be readily extended to its maximum length and can be easily retracted into a compact orientation with the swivel mounting of the fittings preventing entanglement of the hose sections.

9 Claims, 3 Drawing Sheets

SLIDE RAIL HOSE ASSEMBLY

BACKGROUND OF THE INVENTION

Many industrial facilities require convenient access to supplies of water throughout the facility for periodic cleaning of equipment or floors in the facility and for occasional emergency use. Certain dedicated industrial facilities may be designed for water supply at necessary locations. However, most industrial facilities do not include water supplies at all convenient locations. for example, the actual layout of an industrial floor often is completed long after the building is erected and water lines are in place. Thus, water lines typically will be dispersed around the periphery of the building, leaving the central portions of the building, where industrial machines are disposed, with no convenient access to water. Even in specially designed industrial facilities with convenient access to water at important locations, any significant revisions to the industrial plant, such as the periodic replacement of machines, is likely to render the original location of the water supply inefficient and obsolete. this is a particular problem since many industrial facilities frequently upgrade their manufacturing equipment to accommodate the special requirements of new customers or new products.

The changing water supply needs of an industrial facility can be accommodated by re-routing the water pipes in the facility. However, this can be extremely expensive since many components of a water supply system are disposed in walls, subfloors or at below grade locations.

Even if the water supply can be disposed at convenient locations, it is often necessary to employ the water over a fairly broad area. This invariably leads to the use of flexible hoses to provide access to all of the areas which require access to water for periodic cleaning or occasional emergency use. The use of extended flexible hoses in an industrial work place can be hazardous. In particular, employees performing their normal work tasks or travelling between two locations in an industrial work place can trip over an extended hose. Similarly, many industrial work places employ small motorized vehicles for the delivery of supplies tools or the like. Hoses stretched across the paths of travel of such vehicles can result in substantial inconveniences to both the efficient flow of such vehicles and the efficient use of the water supply. Industrial safety and efficiency should absolutely require the hoses to be wound up or otherwise stored between successive uses of the hose. This periodic winding and unwinding adds significantly to labor time and costs, and invariably results in periodically twisted and tangled hoses which further add to manufacturing inefficiencies and safety hazards.

The prior art includes many devices intended to facilitate the use of hoses. For example, U.S. Pat. No. 579,777 which issued to Sergeant on Mar. 30, 1987 shows the use of rigid suspended fittings having inlet and outlet ends angularly separated from one another by about 140°. The opposed ends of the rigid fitting permit threaded interconnection of hose sections thereto. Each fitting includes means for threadably receiving a bolt, which in turn permits a horizontal plate or a C-shaped yoke to be attached to the rigid fitting. The horizontal plate can be slideably received between a pair of opposed C-shaped channels, while the yoke can be slideably placed over a rail. A plurality of such fittings with a corresponding plurality of short hose sections are employed to permit the hose to be selectively extended or retracted somewhat along the length of the C-shaped channels or rails. As shown in U.S. Pat. No. 579,777 the assembly invariably would be very difficult to fully retract and could lead to an interentanglement of the adjacent hose sections that would prevent either complete retraction or easy extension of the assembly. Furthermore, the horizontal plates or C-shaped yokes intended to slide along the C-shaped channels or rails would be subject to substantial friction forces, resulting in jams and a binding of the plates or yokes on the channels or rails.

The prior art also includes references which are intended to permit the movement of a suspended hose through a single circular arc relative to a central supply of water. Examples of such prior art are shown in: U.S. Pat. Nos. 543,709 which issued to Simpson on July 30, 1895; 566,853 which issued to Foreman on Sept. 1, 1896; 570,890 which issued to Baird on Nov. 3, 1896; 589,345 which issued to Emery on Aug. 31, 1897 and 604,898 which issued to Green et al. on May 31, 1898. These various devices employ only a single length of hose which is inconveniently and hazardously suspended from a ceiling to a location adjacent a floor. The range of movement of this single length of hose is limited to the circumference of a selected circle. Retraction of the hose is not permitted by this prior art.

The prior art also includes swivel-type attachments for a reel upon which a hose may be coiled. This prior art includes U.S. Pat. No. 1,046,909 which issued to Wagner on Dec. 10, 1912 and U.S. Pat. No. 2,752,198 which issued to Crow on June 26, 1956. The winding of the hoses onto these reels is difficult and time-consuming, and the hoses would be hazardously disposed on the floor during use.

The prior art includes hose assemblies for mounting to two members that may periodically be moved apart, such as the air hoses that would connect adjacent railway vehicles. Prior art of this type is shown in U.S. Pat. No. 2,034,558 which issued to Bronson on Mar. 17, 1936 and U.S. Pat. No. 2,170,557 which issued to Guarnaschelli on Aug. 22, 1939.

Swivel connections are also shown in the prior art. For example, U.S. Pat. No. 2,831,709 which issued to Shaw et al. on Apr. 22, 1958 shows a swing joint coupling where hose sections are threadably mounted into respective halves of a coupling, with the coupling halves being pivotally mounted to one another. Each half of the coupling includes a generally circumferentially extending fluid carrying channel which permits communication between the two halves of the coupling regardless of the angular orientation of the coupling halves. Another version of a swivel connector for hoses is shown in U.S. Pat. No. 4,437,690 which issued to Drath on Mar. 20, 1984.

The prior art further includes many devices which permit the movement of suspended articles along guideways. One example of a system of this type is shown in U.S. Pat. No. 3,577,930 which issued to Rooklyn on May 11, 1971. Systems of this type for moving articles along a guideway system generally have not been successfully employed in the prior art for systems of hoses.

In view of the above, it is an object of the subject invention to provide an assembly for facilitating the movement of a supply of water into any of a plurality of locations.

It is another object of the subject invention to provide an assembly for facilitating access of water hoses in an industrial work place without placing the hoses on the floor of the work place.

It is another object of the subject invention to provide an assembly which obviates the need to periodically rewind a hose.

Still a further object of the subject invention is to provide an assembly comprising an array of interconnected hoses that can rapidly be extended or completely retracted without interentanglement of the hose sections.

Still an additional object of the subject invention is to provide an assembly with interconnected hoses that can efficiently and quickly be moved along a rail without binding.

Another object of the subject invention is to provide an interconnected assembly of hoses that can readily be removed from a rail to provide a wider range of uses for the assembly.

SUMMARY OF THE INVENTION

The subject invention is directed to a hose assembly that is efficiently suspended from an elevated rail. The assembly comprises a plurality of swivel joints each of which permits a pair of hose sections to be releasably connected thereto. Each swivel joint comprises a suspendable seal plate and a pair of opposed fittings pivotably mounted in sealed relationship to opposed respective sides of the seal plate. Each fitting comprises means for releasably connecting a section of hose thereto, and means for permitting fluid communication through the fitting. Resilient seal means may be disposed between opposed mateable surfaces of the fittings and/or between the interfaces of the suspendable seal plate and the fittings. The resilient seal means may be mounted under compression sufficient to prevent leakage, but to permit pivoting movement of the fittings relative to one another and relative to the suspendable seal plate.

The suspendable seal plate may be a generally planar structure having a generally arcuate outer periphery for mating with correspondingly configured portions of the opposed fittings. The seal plate may further comprise apertures at selected locations to permit fluid communication therethrough, while maintaining a tight seal around the periphery. The suspendable seal plate further comprises mounting means for removable and/or pivotable mounting of the seal plate to carriage means for movement along a rail. In particular, a hanger may extend from a peripheral location on the suspendable seal plate. The hanger may have a generally cylindrical neck that may terminate in an enlarged head. the cylindrical neck may be rotatable relative to a carriage. However, the enlarged head may prevent gravitational withdrawal of the suspendable hanger from the carriage.

Each swivel joint may be employed with a carriage in which the suspendable seal plate is mounted. Removable mounting of the suspendable seal plate in the carriage permits the swivel joint and hoses connected thereto to be readily removed from the carriage for repair or replacement of parts as necessary, and for extending the access of the assembly under certain emergency conditions or to particularly inaccessible locations.

The carriage comprises means for permitting movement of the carriage along a rail. For example, the carriage may comprise a plurality of rotatable wheels which may be formed from a material that permits smooth, quiet movement of the carriage along an appropriate rail. In particular, the wheels of the carriage may be formed from nylon or other suitable plastic. The carriage may comprise a slot for receiving the suspendable seal plate of the swivel joint.

The carriage of the subject slide rail hose assembly is movably mounted on a rail for efficient movement therealong. The rail may define a generally U-shaped channel having inwardly facing flanges at the opened end of the U-shaped cross-section. Wheels, glides or other such means on the carriage may be rotatably or slideably engaged with the flanges of the channel. Thus, the carriages may be readily moved in either direction with respect to the channel or other such rail of the assembly.

The assembly further comprises an array of hoses. in particular, a connecting hose may extend from a supply of water to one fitting of a swivel joint. A plurality of short intermediate hoses may extend between and connect fittings of adjacent swivel joints. A relatively short nozzle hose may connect to and extend from the fitting of the swivel joint most distant from the supply of water. This nozzle hose may be provided with an appropriate nozzle, and may further be provided with connection means for affixing the free end of the hose to a portion of the nozzle hose closer to the swivel joint to prevent the nozzle hose from dragging into an area where it would impede other activities in the industrial area where the assembly is employed.

In use, the assembly can be readily extended by merely pulling on the nozzle hose. The swivel joints intermediate the nozzle hose and the supply of water will slide or roll along the rail such that the slide rail hose assembly can be advanced into an extended orientation. This extension of the assembly is facilitated both by the sliding or rolling movement of the carriage along the rail and by the pivotable movement of the respective fittings of each swivel joint. Thus, the suspendable seal plate performs the dual function of enabling pivotable movement of the fittings relative to the suspendable seal plate and further enabling sliding or rolling movement of the respective carriages along the rail. The ability of the opposed fittings of each swivel joint to rotate freely relative to the suspendable seal plate ensures efficient movement of the respective swivel joints and hose sections into a fully extended position without entanglement. Similarly, the slide rail hose assembly can be readily fully retracted for compact storage in close proximity to the supply of water. The retraction of the slide rail hose assembly may be carried out quickly without any significant likelihood of tangling of the hose sections by virtue of the ability of each fitting in the swivel joints to freely rotate relative to the suspendable seal plate thereof, and in view of the ability of the suspendable seal plate to rotate slightly or otherwise move relative to the corresponding carriage.

DETAILED DESCRIPTION OF THE PREFERRED EMBODIMENT

Figure 1:
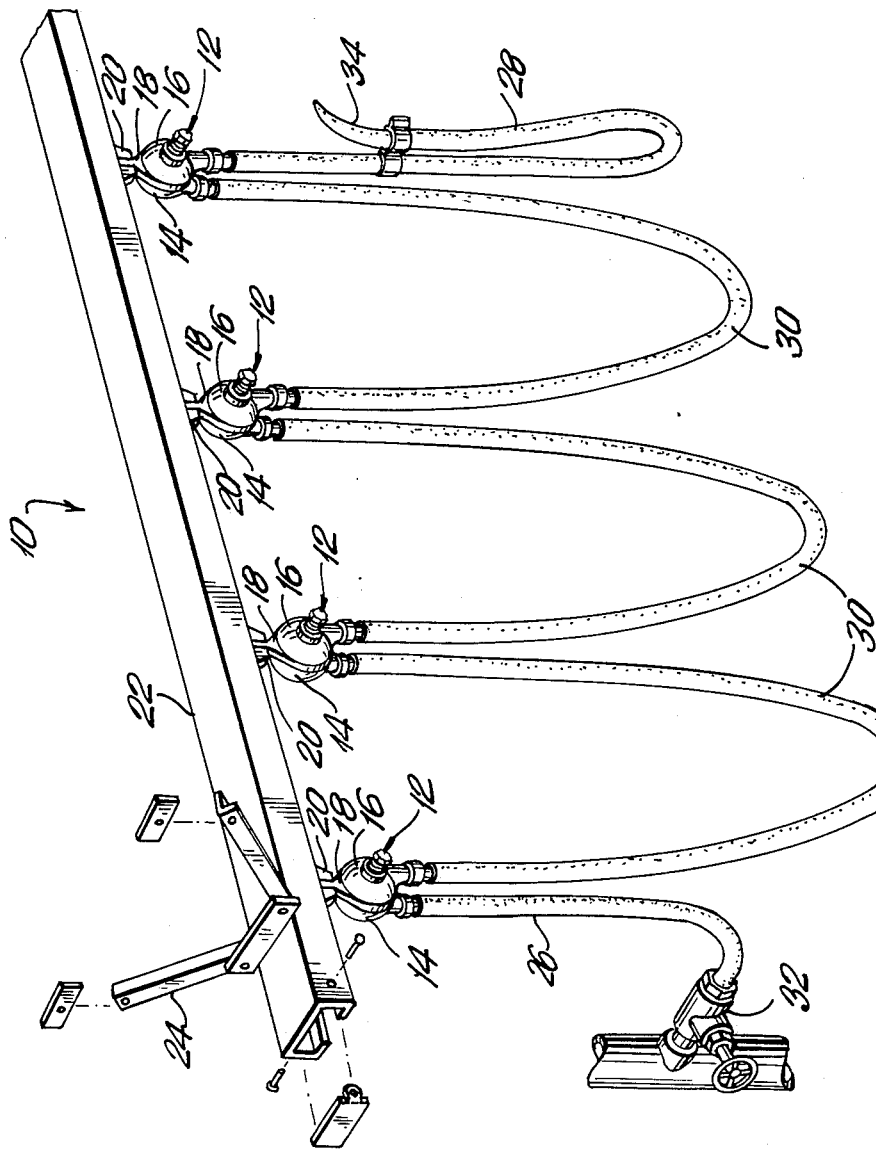
FIG. 1 is an exploded perspective view of the slide rail hose assembly of the subject invention.

The slide rail hose assembly of the subject invention is indicated generally by the numeral 10 in FIG. 1. The slide rail hose assembly 10 comprises a plurality of swivel joints 12, each of which comprises fittings 14 and 16 which are connected respectively to opposed sides of a suspendable seal plate 18. The fittings 14 and 16 of each swivel joint 12 are selectively pivotable about their respective mountings to the suspendable seal plate 18.

Each respective swivel joint 12 is removably suspended from a carriage 20 which is movably mounted to an elongated rail 22. More particularly, as explained in greater detail below, each carriage 20 includes appropriate means for efficient sliding or rolling movement of the carriage 20 and the corresponding swivel joint 12 suspended therefrom along the length of the rail 22 to permit the slide rail hose assembly 10 to be selectively extended or retracted. The rail 22 is constructed for suspension from appropriate structural supports in an industrial work place, such as a ceiling or the support beams of a ceiling. The mounting of the rail 22 to the ceiling may be carried out by brackets 24 or other suitable support structures.

The slide rail hose assembly 10 further comprises a connecting hose 26, a nozzle hose 28 and a plurality of intermediate hoses 30. The connecting hose 26 is releasably connected to a fitting 14 of one swivel joint 12. The opposed end of the connecting hose 26 is releasably connected to a supply of water identified generally by the numeral 32 in FIG. 1. The intermediate hoses 30 extend between and are releasably connected to the fittings 14 or 16 of adjacent swivel joints 12. The nozzle hose 28 extends from a fitting 14 or 16 of the swivel joint 12 most distant from the supply of water 32, and includes a nozzle 34 at the remote end thereof.

The slide rail hose assembly 10, as depicted in FIG. 1 and explained briefly above, enables the hoses 26-30 to be easily and quickly extended to a maximum length by merely pulling upon the nozzle hose 28. A force exerted on the nozzle hose 28 will permit the carriages 20 to be appropriately advanced along the length of the rail 22, thereby enabling the nozzle 34 of the nozzle hose 28 to be appropriately employed in the industrial work place. If necessary, one or more of the swivel joint assemblies 12 adjacent the nozzle hose 28 of the slide rail hose assembly 10 can be removed from the corresponding carriages 20 for use in response to a particular emergency or for cleaning an inaccessible location in the industrial work place. Upon completion of the use of the slide rail hose assembly 10 the nozzle hose 28 is merely pulled back toward the supply of water 32. Thus, the respective carriages 20 to which each corresponding swivel joint 12 is mounted will slide or roll longitudinally along the rail 22 back toward the supply of water 32.

The pivotable connection of the fittings 14 and 16 about the corresponding suspendable seal plates 18 of each swivel joint 12 permits a tight collapsing of the various parts of the slide rail hose assembly 10 to ensure that the hoses 26-30 thereof are safely and compactly stored. Furthermore, this pivotable movement of the fittings 14 and 16 of each respective swivel joint 12 ensures a substantially tangle-free arrangement of the hoses 26-30 in the collapsed conditions of the slide rail hose assembly 10.

Figure 2:
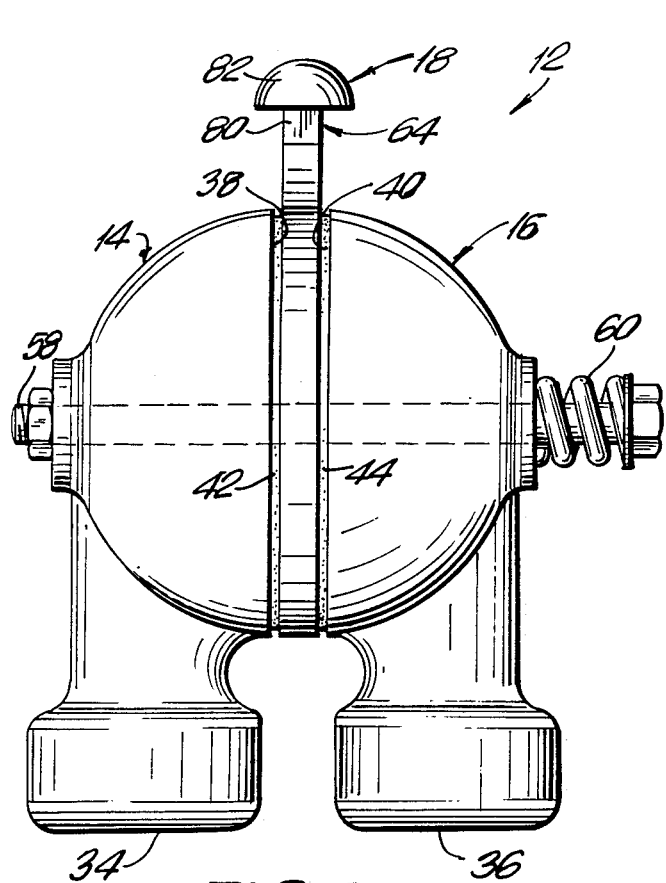
FIG. 2 is a front elevational view of the swivel joint of the subject invention.
Figure 3:
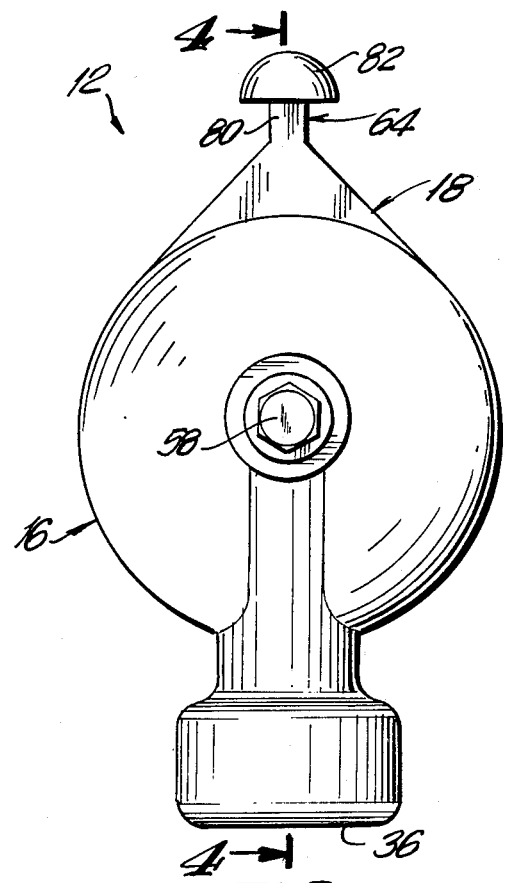
FIG. 3 is a side elevational view of the swivel joint shown in FIG. 2.
Figure 4:
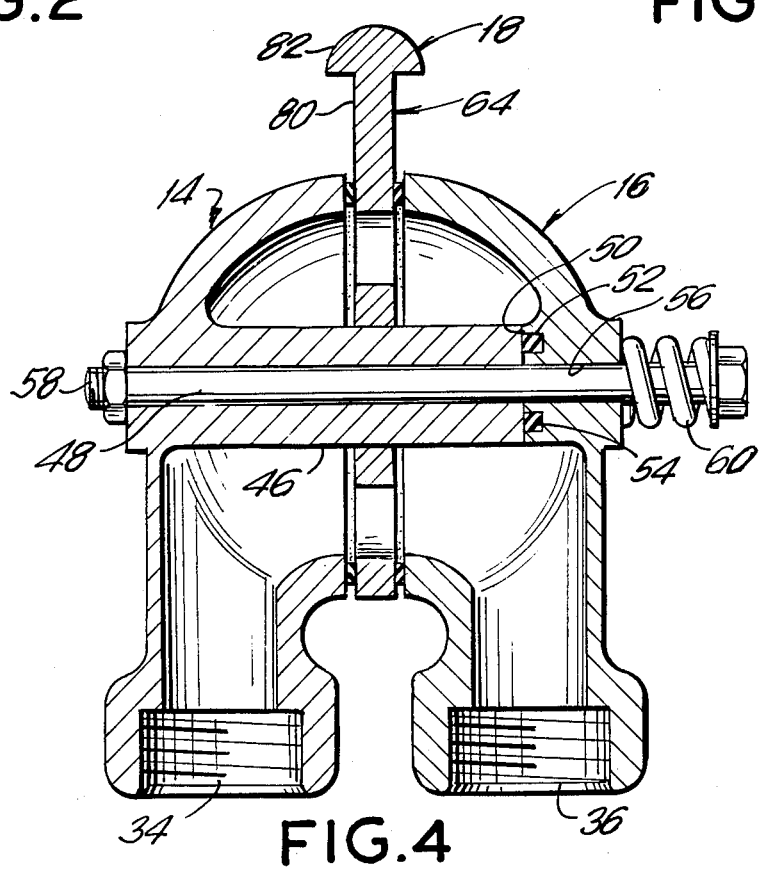
FIG. 4 is a cross-sectional view taken along line 4—4 in FIG. 3.
Figure 5:
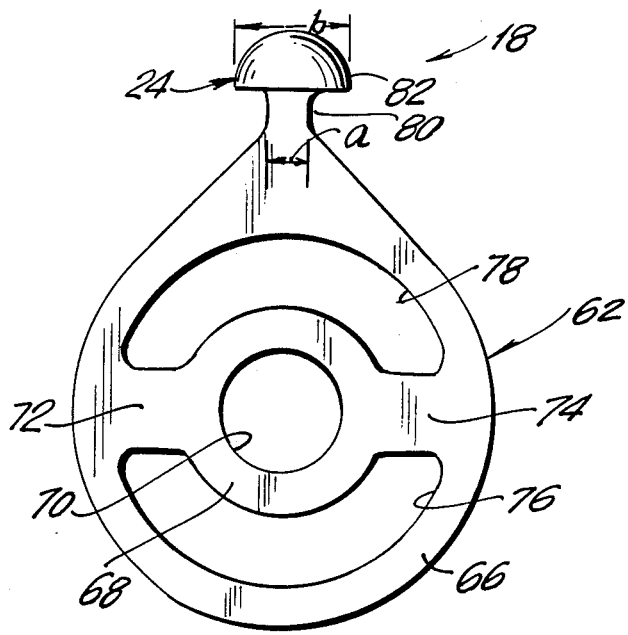
FIG. 5 is a front elevational view of the suspendable swivel plate employed in the swivel joint.
Figure 6:
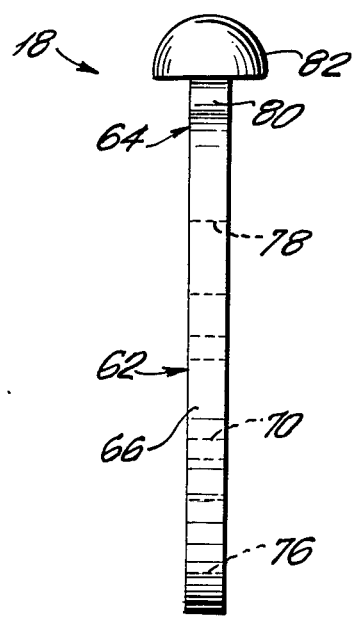
FIG. 6 is a side elevational view of the suspendable swivel plate.

The swivel joint 12 is illustrated in greater detail in FIGS. 2-4, with the suspendable seal plate 18 thereof being further illustrated in FIGS. 5 and 6. As shown in FIGS. 2-4, the swivel joint 12 comprises fittings 14 and 16 which are pivotally mounted to opposed sides of the generally planar suspendable seal plate 18. The fittings 14 and 16 define substantially hollow structures having threaded ends 34 and 36 respectively for releasable threaded interconnection with appropriate short lengths of hose 26-30. The respective faces 38 and 40 of the fittings 14 and 16 which mate with the opposed planar faces of the suspendable seal plate 18 define substantially circular peripheral walls. Resilient O-rings 42 and 44 respectively are secured intermediate the respective fittings 14 and 16 and the corresponding opposed planar surfaces of the suspendable seal plate 18. The O-rings 42 and 44 permit pivotal movement of the respective fittings 14 and 16 relative to one another and relative to the suspendable seal plate 18 without leakage of fluid from the swivel joint 12.

The fittings 14 and 16 are connected to one another as shown most clearly in FIG. 4. More particularly, the fitting 14 includes a mounting nipple 46 which extends concentrically to the circumferential mounting face 38 of the fitting 14. The mounting nipple 46 is provided with a longitudinally extending axially aligned central bore 48 extending therethrough. The fitting 16 includes a concentrically aligned interiorly disposed mounting face 50 for mating with the mounting nipple 46 of the fitting 14. The mounting face 50 of the fitting 16 is provided with an annular groove 52 therein in which a resilient O-ring 54 is mounted. The fitting 16 is further provided with a mounting aperture 56 which is centrally disposed with respect to the annular mounting face 40 thereof. In the assembled condition, as shown most clearly in FIG. 4, the end of the mounting nipple 46 of the fitting 14 engages the mounting face 50 of the fitting 16 and sealingly compresses the O-ring 54. A bolt 58 with a coil spring 60 mounted thereabout extends entirely through the mounting apertures 48 and 56 of the fittings 14 and 16 respectively to bias the fittings 14 and 16 against the O-rings 42 and 44 on opposed sides of the suspendable seal plate 18.

The suspendable seal plate 18, as depicted most clearly in FIGS. 5 and 6, includes a generally circular planar seal 62 and a hanger 64. The planar seal 62 includes an annular outer sealing flange 66 dimensioned for sealing engagement with the O-rings 42 and 44 which, in turn, sealingly engage the opposed mating faces 38 and 40 of the fittings 14 and 16. The planar seal 62 of the suspendable seal plate 18 further comprises a centrally disposed annular mounting flange 68 having a central through aperture 70 dimensioned for sliding engagement over the mounting nipple 46 of the fitting 14. The central annular mounting flange 68 is rigidly joined to the annular outer sealing flange 66 by radial connections 72 and 74. As shown most clearly in FIG. 5, the suspendable seal plate 18 is provided with generally arcuate through apertures 76 and 78 between the annular outer sealing flange 66 and the central annular mounting flange 68. Returning to FIG. 4, it will be noted that the through apertures 76 and 78 provide for fluid communication between the fittings 14 and 16.

The hanger 64 of the suspendable seal plate 18 is unitarily connected to the planar seal 62 thereof. More particularly, the hanger 64 comprises a generally arcuate or cylindrical neck 80 having a width "a" and an enlarged generally semi-spherical head 82 having a diameter "b". As will be explained further below, the hanger 64 enables the entire swivel joint 12 depicted in FIGS. 2–4 to be suspended in the movable carriage 20 with at least some rotational movement of the swivel joint 12 in the carriage 20 being permitted in response to forces exerted on the swivel joint 12.

Figure 7:
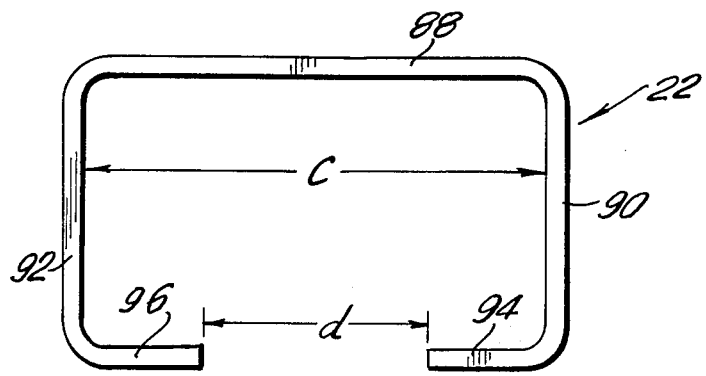
FIG. 7 is an end view of the channel along which the assembly is movable and from which the assembly is suspended.

FIG. 7 shows an end view of the rail 22 depicted generally in FIG. 1. More particularly, the rail 22 is an elongated structural member of generally C-shaped cross section. The rail 22 has a top supporting wall 84 and opposed side walls 90 and 92 which extend from opposed longitudinal sides of the top wall 88 and which are spaced from one another by distance "c". Opposed inwardly directed support flanges 94 and 96 extend toward one another from the respective side walls 90 and 92. The support flanges 94 and 96 are spaced from one another by distance "d" to permit a carriage 20 supported on the flanges 94 and 96 to be readily moved therebetween.

Figure 8:
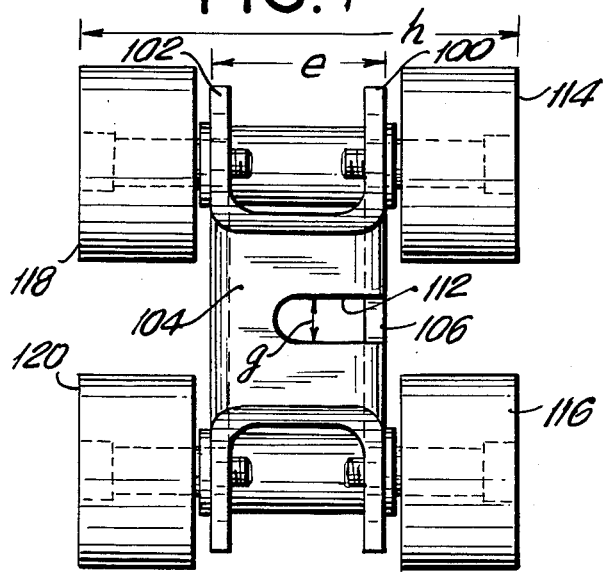
FIG. 8 is a top plan view of a carriage used with the channel and swivel joint of the subject invention.
Figure 9:
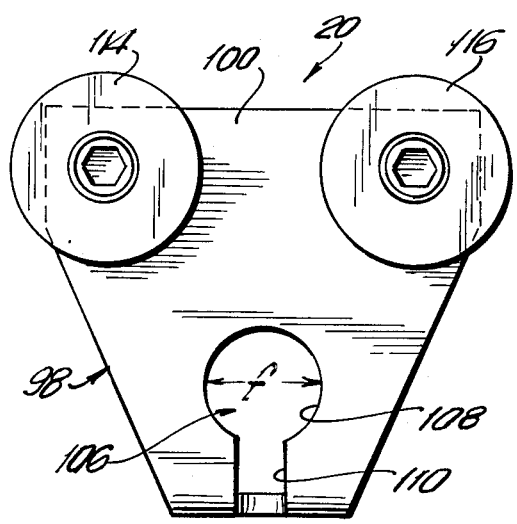
FIG. 9 is a side elevational view of the carriage.

The carriage 20 is shown in greater in FIGS. 8 and 9. More particularly, the carriage 20 comprises a generally U-shaped body 98 defined by opposed side walls 100 and 102 and a bottom wall 104 extending unitarily therebetween. The side walls 100 and 102 define a width "e" which is less than the distance "d" between the flanges 94 and 96 on the rail 22. A generally key-hole shaped mounting slot 106 extends into the side wall 100, and is characterized by an enlarged generally circular top opening 108 and a narrow elongated bottom opening 110 which extends substantially the entire distance to the bottom wall 104 of the body 98. The circular top opening 108 of the slot 106 in the side wall 100 has a diameter "f" which is greater than the diameter "b" of the enlarged semi-spherical head 82 of the suspendable seal plate 18. The bottom wall 104 of the carriage body 98 is further provided with a slot 112 which is aligned with and intersects the slot 106 in the side wall 100. More particularly, the slot 112 in the bottom wall 104 has a width "g" substantially equal to the width of the narrow bottom opening 110 of the slot 106 in the side wall 100. The width "g" of the slot 112 in the bottom wall 104 is greater than the maximum crosssectional dimension "a" of the neck 80 on the hanger 64 of the suspendable seal plate 18. However, the width "g" of the slot 112 is less than the diameter "b" of the enlarged head 82 on the hanger 64 of the suspendable seal plate 18. As a result of this construction, the suspendable seal plate 18 and the entire swivel joint 12 can be loosely suspended in the slot 112 of the carriage 20, with the enlarged head 82 of the seal plate 18 engaging portions of the carriage bottom wall 104 adjacent the slot 112 therein. Furthermore, the construction of the slots 106 and 112 permit the suspendable seal plate 18 to be at least partially rotated about the longitudinal axis of the neck 82 thereof. Furthermore, the suspendable seal plate 18 and the entire swivel joint 12 can readily be removed from the carriage 20 to extend to reach of the slide rail hose assembly 10 to access otherwise inaccessible locations or for use in certain emergencies. The removability of the swivel joint 12 from the carriage 20 further facilitates repairs or replacement of parts as necessary.

The carriage 20 further comprises wheels 114 and 116 rotatably mounted to the side wall 100, and wheels 118 and 120 rotatably mounted to the side wall 102. The wheels 114-120 preferably are formed from a nylon or other suitable plastic to achieve a quiet rolling action relative to the body 98 of the carriage 20. The overall width "h" of the opposed wheels 114/118 and 116/120 is less than the internal width "c" of the rail 22. As a result, the carriage 20 can be inserted in the generally C-shaped rail 22 with the wheels 114-120 rollably mounted on the support flanges 94 and 96 thereof. In this orientation, the body 98 of the carriage 20 will extend between the support flanges 94 and 96 to permit the swivel joint 12 to be suspended therefrom.

In summary, a slide rail hose assembly is provided comprising a plurality of swivel joints removably mounted respectively to carriages. The carriages in turn are movably mounted to an elongated rail. Each swivel joint comprises a pair of opposed fittings to which hoses are removably connected. Each swivel joint further comprises a suspendable seal plate having a generally planar seal and a hanger extending therefrom. The opposed fittings of each swivel joint are sealably and pivotably mounted to opposed sides of the suspendable seal plate to permit rotation of the fittings relative to the seal plate and to permit fluid communication therethrough. The hanger of the suspendable seal plate is removably mountable in a carriage having means for rolling or sliding movement along the rail. Preferably the carriage comprises a plurality of wheels which are dimensioned for rolling engagement with the rail. The slide rail hose assembly can be readily extended or fully retracted without likelihood of entanglement of the hose sections with one another.

While the invention has been described with respect to a preferred embodiment, it is apparent that various changes can be made without departing from the scope of the invention as defined by the appended claims.

I claim:

1. A slide rail hose assembly comprising:
   an elongated rail;
   a plurality of carriages mounted to said rail for movement therealong;
   a plurality of swivel joints connected respectively to said carriages, each said swivel joint comprising a suspendable seal plate removably suspended from said carriage;
   a pair of opposed fittings mounted respectfully to opposite sides of said suspendable seal plate to permit fluid communication therebetween and to permit pivotal movement of said fittings relative to said seal plate, each of said fittings comprising connecting means for releasable connection to an end of a hose;
   a connecting hose releasably connected to one said fitting of one said swivel joint, and further being releasably connectable to a supply of water;
   a plurality of intermediate hoses, each said intermediate hose having a pair of opposed ends, one end of each intermediate hose being releasably connected to one said fitting of one said swivel joint, and the opposed end of each said intermediate hose being releasably connected to the fitting of another swivel joint; and a nozzle hose releasably connected to the fitting of one said swivel joint, said nozzle hose comprising a nozzle at the end hereof removed from the associated swivel joint, wherein the suspendable seal plate comprises a generally planar seal and a hangar extending unitarily therefrom, the seal of said suspendable seal plate being disposed intermediate the fittings of the corresponding swivel joint, whereby said swivel joints can be releasably interconnected to one another with a plurality of hoses, and whereby the interconnected swivel joints can be selectively extended or retracted by movement of the carriages along the rail.

2. A slide rail hose assembly as in claim 1 further comprising a pair of generally annular O-rings disposed between the respective fitting of each said swivel joint and the corresponding seal plate thereof.

3. A slide rail hose assembly as in claim 1 wherein the hanger of said suspendable seal plate comprises a generally cylindrical neck and an enlarged head for releasable connection to the associated carriage.

4. A slide rail hose assembly as in claim 3 wherein each said carriage comprises a generally U-shaped body having a pair of opposed spaced apart side walls and a bottom wall extending therebetween, one said side wall and said bottom wall being characterized by interconnected slots configured and dimensioned for removably receiving the hanger of said suspendable seal plate.

5. A slide rail hose assembly as in claim 4 wherein the slot formed in the side wall of said carriage body includes an enlarged opening spaced from the bottom wall of the carriage body.

6. A slide rail hose assembly as in claim 5 wherein said carriage further comprises at least one wheel mounted to the side wall of said carriage body, said wheel being in rolling engagement with said rail.

7. A slide rail hose assembly as in claim 6 wherein said carriage body is of generally U-shape and comprises a bottom wall and a pair of opposed side walls extending from said bottom wall, said carriage further comprising a pair of wheels rotatably mounted to each of said side walls and disposed in rolling engagement with the rail.

8. A slide rail hose assembly as in claim 7 wherein said rail is of generally C-shape cross section, and comprises a longitudinally extending top support wall, a pair of opposed side walls extending from opposite longitudinal sides of said top support wall and a pair of spaced apart inwardly directed support flanges extending toward one another from the respective side walls, said rail being dimensioned to receive the wheels of said carriage therein such that the wheels are in rolling engagement with the support flanges.

9. A slide rail hose assembly comprising:

an elongated generally C-shaped rail having a pair of longitudinally spaced apart support flanges;

a plurality of carriages, each said carriage comprising a generally U-shaped body having a pair of spaced apart side walls and a bottom wall extending unitarily therebetween, each of said side walls comprising at least one wheel rotatably mounted thereto, said wheels and said body being dimensioned for rolling engagement along the support flanges of said elongated rail, one said side wall of said carriage body and the bottom wall thereof being characterized by a mounting slot, said mounting slot including an enlarged opening on a portion thereof extending into the side wall and spaced from the bottom wall;

a plurality of swivel joints corresponding in number to the plurality of carriages, each said swivel joint comprising a suspendable seal plate having a planar seal portion and a hanger, said hanger being removably mounted in the slot of the corresponding carriage, said swivel joint further comprising opposed fittings sealably mounted to opposed sides of the suspendable seal plate such that each said fitting is pivotably relative to said seal plate, each said joint further comprising a mounting portion for releasable attachment of a hose thereto; and a plurality of hoses, each said hose being characterized by a pair of opposed ends, with the ends of said hoses being releasably connected to the respective fittings of said swivel joints to define an interconnected assembly of hoses which is connectable to a supply of water, whereby said hoses can be selectively extended or completely retracted relative to said rail by rolling movement of said carriages and the associated swivel joints along the rail.

* * * * *